US 008262942B2

(12) United States Patent
Wagner et al.

(10) Patent No.: US 8,262,942 B2
(45) Date of Patent: Sep. 11, 2012

(54) HOLLOW CARBON NANOSPHERE BASED SECONDARY CELL ELECTRODES

(75) Inventors: Michael J. Wagner, Rockville, MD (US); Jonathan Cox, Alexandria, VA (US); Thomas McKinnon, Boulder, CO (US); Keith Gneshin, Salt Lake City, UT (US)

(73) Assignee: The George Washington University, Washington, DC (US)

( * ) Notice: Subject to any disclaimer, the term of this patent is extended or adjusted under 35 U.S.C. 154(b) by 308 days.

(21) Appl. No.: 12/368,009

(22) Filed: Feb. 9, 2009

(65) Prior Publication Data

US 2009/0200518 A1 Aug. 13, 2009

Related U.S. Application Data

(60) Provisional application No. 61/030,326, filed on Feb. 21, 2008, provisional application No. 61/026,871, filed on Feb. 7, 2008.

(51) Int. Cl.
*H01B 1/04* (2006.01)
*H01B 1/06* (2006.01)
*H01B 5/00* (2006.01)
*H01M 4/13* (2010.01)

(52) U.S. Cl. ............... 252/502; 252/511; 174/126.1; 429/213

(58) Field of Classification Search .......... 252/502, 252/511; 429/209, 212, 213; 174/126.1
See application file for complete search history.

(56) References Cited

U.S. PATENT DOCUMENTS

| 5,302,474 | A | 4/1994 | Shackle |
| 6,280,697 | B1 | 8/2001 | Zhou et al. |
| 6,749,827 | B2 | 6/2004 | Smalley et al. |
| 6,827,823 | B2 | 12/2004 | Takikawa et al. |
| 6,835,366 | B1 | 12/2004 | Margrave et al. |
| 6,890,685 | B2 | 5/2005 | Yamamoto et al. |
| 7,531,273 | B2* | 5/2009 | Wagner et al. ............ 429/231.8 |
| 7,601,321 | B2 | 10/2009 | McKinnon et al. |
| 7,935,276 | B2* | 5/2011 | Zhou et al. .................. 252/511 |
| 2001/0016283 | A1 | 8/2001 | Shiraishi et al. |
| 2002/0127351 | A1 | 9/2002 | Takikawa et al. |
| 2003/0086859 | A1 | 5/2003 | Kawakami et al. |
| 2004/0110005 | A1* | 6/2004 | Choi et al. ..................... 428/402 |
| 2004/0227146 | A1 | 11/2004 | Wu |
| 2004/0265210 | A1 | 12/2004 | Shinohara et al. |
| 2005/0130040 | A1 | 6/2005 | Yang et al. |
| 2005/0158626 | A1* | 7/2005 | Wagner et al. ............ 429/231.8 |
| 2006/0137487 | A1 | 6/2006 | McKinnon et al. |

(Continued)

FOREIGN PATENT DOCUMENTS

WO WO 98/39250 9/1998

(Continued)

OTHER PUBLICATIONS

Lamb et al., "Extraction and STM Imaging of Spherical Giant Fullerenes," Science, 255, pp. 1413-1416 (Mar. 13, 1992).*

(Continued)

*Primary Examiner* — Mark Kopec
*Assistant Examiner* — Jaison Thomas
(74) *Attorney, Agent, or Firm* — Panitch Schwarze Belisario & Nadel LLP

(57) ABSTRACT

The inventive subject matter relates to hollow carbon nanospheres (HCNS) as a material for making ion storage material, and particularly lithium ion storage material used for batteries.

12 Claims, 2 Drawing Sheets

U.S. PATENT DOCUMENTS

2006/0278159 A1   12/2006   Gregory et al.

FOREIGN PATENT DOCUMENTS

| WO | WO 00/17101 | 3/2000 |
| --- | --- | --- |
| WO | WO 00/21905 | 4/2000 |
| WO | WO 00/31811 | 6/2000 |
| WO | WO 01/30694 | 5/2001 |
| WO | WO 01/70392 | 9/2001 |
| WO | WO 01/93999 | 12/2001 |
| WO | WO 02/30816 | 4/2002 |
| WO | WO 02/41417 | 5/2002 |
| WO | WO 03/021015 | 3/2003 |
| WO | WO 03/021016 | 3/2003 |
| WO | WO 03/021017 | 3/2003 |
| WO | WO 03/050040 | 6/2003 |
| WO | WO 03/073538 | 9/2003 |
| WO | WO 2004/010512 | 1/2004 |
| WO | WO 2004/057070 | 1/2004 |
| WO | WO 2004/089820 | 7/2004 |
| WO | WO 2004/089352 | 10/2004 |
| WO | WO 2005/089390 | 9/2005 |
| WO | WO 2006/020167 | 2/2006 |
| WO | WO 2006/023922 | 3/2006 |
| WO | WO 2006/028704 | 3/2006 |
| WO | WO 2006/099749 | 9/2006 |
| WO | WO 2006/131873 | 9/2006 |
| WO | WO 2006/137893 | 12/2006 |
| WO | WO 2007/015710 | 2/2007 |
| WO | WO 2007/057501 | 5/2007 |
| WO | WO 2007/061945 | 5/2007 |

OTHER PUBLICATIONS

Wang et al., "Graphitized Carbon Nanobeads with an Onion Texture as a Lithium-Ion Battery Negative Electrode for High-Rate Use," Adv. Mater., 17, pp. 2857-2860 (2005).*

Wu et al., "Necklace-like Hollow Carbon Nanospheres from the Pentagon-Including Reactants: Synthesis and Electrochemical Properties," Inorg. Chem. 45, pp. 8543-8550 (2006).*

("Michigan Tech, NUE 2003-2004," http://nano.mtu.edu/Nanospheres.htm.*

Yoshizawa et al., "TEM and electron tomography studies of carbon nanospheres for lithium secondary batteries," Carbon, 44 pp. 2558-2564 (2006).*

Wang et al., "Preparation and Characterization fo Carbon Nanospheres as Anode Materials in Lithium-Ion Secondary Batteries," Ind. Eng. Chem. Res., 47, pp. 2294-2300 (2008).*

Wang et. al., "Crystalline Carbon Hollow Spheres, Crystalline Carbon-SnO2 Hollow Spheres, and Crystalline SnO2 Hollow Spheres: Synthesis and Performance in Reversible Li-Ion Storage" Chem. Mater., 18, pp. 1347-1353 (2006).*

Herring et al, "A Novel Method for the Templated Synthesis of Homogeneous Samples of Hollow Carbon. Nanospheres from Cellulose Chars," Journal of the American Chemical Society, vol. 125, pp. 9916-9917 (2003).

Doe et al, "Dramatic Effects of Fullerene Soot Additives on the Electrochemical Cycling Behavior of Graphite Anodes," Journal of the Electrochemical Society, vol. 153, No. 10, pp. A1880-A1885 (2006).

* cited by examiner

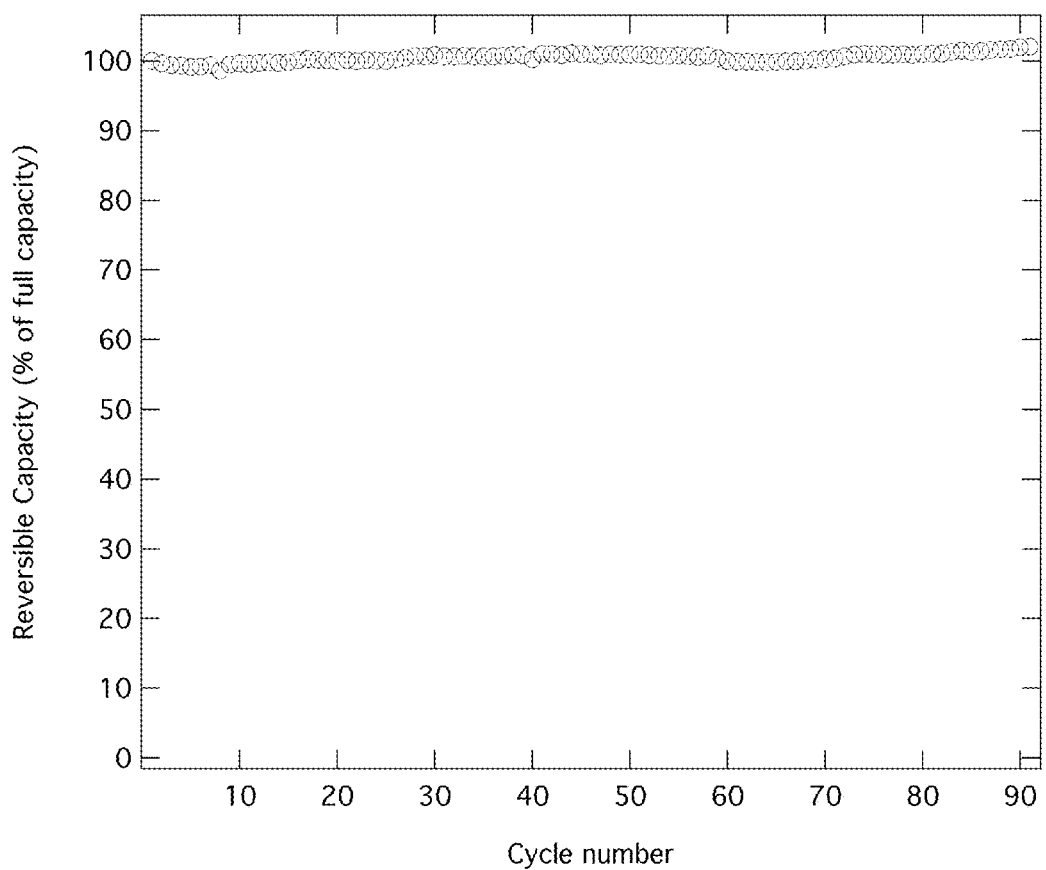

HOLLOW CARBON NANOSPHERE BASED SECONDARY CELL ELECTRODES

CROSS REFERENCE TO RELATED APPLICATIONS

This application claims priority under 35 USC 119(e) and is entitled to the benefit of the filing date of 61/030,326 filed Feb. 21, 2008 and 61/026,871 filed Feb. 7, 2008, the contents of which are incorporated herein in their entirety.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

REFERENCE TO A SEQUENCE LISTING

A table or a computer list appendix on a compact disc
[ ] is
[×] is not
included herein and the material on the disc, if any, is incorporated-by-reference herein.

FIELD OF THE INVENTION

The present invention relates to utilizing hollow carbon nanospheres (HCNS) as negative electrode active material for lithium ion batteries. Hollow carbon nanospheres are useful for making quick-charge and discharge Lithium ion batteries, providing an alternative technology to address functional needs at the battery/capacitor intersection.

BACKGROUND OF THE INVENTION

Prior art patents and publications related to Hollow Carbon nanospheres (HCNS), include U.S. Pat. No. 6,280,697 entitled "Nanotube-based high energy material and method", which discloses generally in the field of HCNS, and describes materials comprising single-walled carbon nanotubes and intercalated lithium metal, said material having a reversible capacity greater than 550 mAh/g (claim 6). However, it does not appear to describe hollow nanospheres. U.S. Patent Publication 20060278159 entitled "Nanostructures", discloses HCNS, and describes lithium nitride nanotubes, wherein the nanotubes may includes spheres. U.S. Patent Publication 20040265210 entitled "Method for preparing hollow nanofiber, hollow nanofiber and catalyst composition for preparing hollow nanofiber", discloses HCNS, and describes hollow carbon nanofiber for Li batteries.

SUMMARY OF THE INVENTION

In a preferred embodiment, this invention relates to an ion storage material, comprising hollow carbon nanosphere material.
In a preferred embodiment, the weight percentage of hollow carbon nanosphere material within the ion storage material composition is no less than about 30%, or is no less than about 20%, or no less than about 10%.

In another preferred embodiment, the ion storage material further comprises a binder material.

In yet another preferred embodiment, the ion storage material further comprises a carbonaceous material wherein the carbonaceous material includes graphite, lamellar graphite, pitch, coal pitch, coke, carbon black and/or other electrical conducting carbon materials, carbon-arc generated soot, and any combinations thereof.

In another preferred embodiment, there is provided an electrode comprising the ion storage material. Such an electrode can be included within a secondary ion battery.

In another preferred embodiment, there is provided a lithium ion storage material, comprising hollow carbon nanosphere material.

In a preferred embodiment, the weight percentage of hollow carbon nanosphere material within the lithium ion storage material composition is no less than about 30%, or is no less than about 20%, or no less than about 10%.

In another preferred embodiment, the lithium ion storage material further comprises a binder material.

In yet another preferred embodiment, the lithium ion storage material further comprises a carbonaceous material wherein the carbonaceous material includes graphite, lamellar graphite, pitch, coal pitch, coke, carbon black and/or other electrical conducting carbon materials, carbon-arc generated soot, and any combinations thereof.

In another preferred embodiment, there is provided an electrode comprising the lithium ion storage material. Such an electrode can be included within a secondary lithium ion battery.

BRIEF DESCRIPTION OF THE DRAWINGS

FIG. 2 of the present invention is a graph of measured data regarding the reversible capacity of a cell made according to Example 2 with an electrode made using the HCNS of the present invention.

DETAILED DESCRIPTION OF THE PREFERRED EMBODIMENTS

Figure 1:
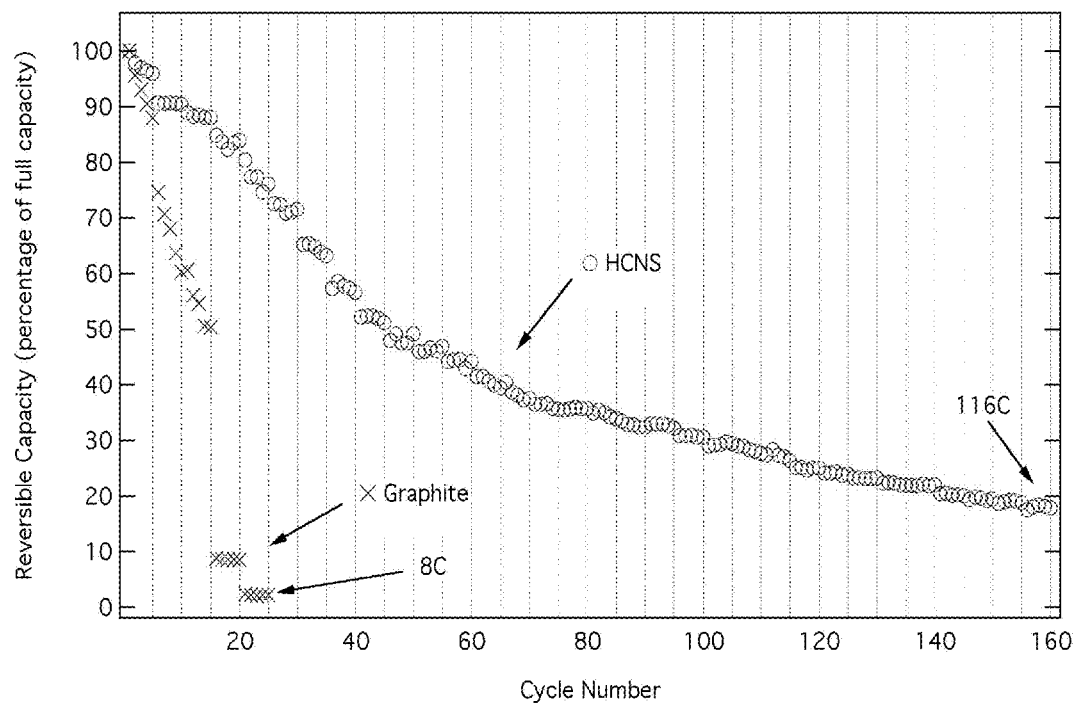
FIG. 1 of the present invention is a graph of measured data regarding the reversible capacities for two cells made according to Example 1, where open circles represent data for an electrode made using the non-fullerenic hollow carbon nanospheres (HCNS) of the present invention and Xes represent data for a graphite electrode.

Hollow Carbon Nanosphere Description and Its Production by a Method Previously Described in U.S. Patent Application Publication #20060137487, now U.S. Pat. No. 7,601,321, the disclosure of which is incorporated herein in its entirety.

Hollow carbon nanospheres (HCNS), as used herein, are material composed of highly-crystalline concentric graphene sheets surrounding a hollow core obtained by heating a carbon source by laser pyrolysis or other heating sources such as autoclaving, plasma torches, and arc lamps, using nickel or other metals (especially 3 d transition metals such as iron or cobalt) metal as a templating catalyst. The carbon source can be cellulose, wood pulp, organic polymers, or other appropriate material.

Any suitable method can be utilized to mix the HCNS with a conductive additive and binder material to form a generally uniform and homogeneous electrode composition. In an exemplary method, Hollow carbon nanospheres (HCNS) were synthesized using a two-step pyrolysis technique.

The carbon source for the HCNS synthesis was from Avicel cellulose, a highly crystalline form of the wood-derived biopolymer. The preferred catalyst was nickel chloride, a water-soluble nickel salt that readily forms a homogeneous mixture with Avicel via an incipient wetness technique. To prepare the metal-doped cellulose mixture, nickel chloride was dissolved completely in water then Avicel was added to the solution at a weight ratio of 2 grams Avicel per 1 gram of fully hydrated nickel salt. The mixture was oven-dried at 85° C. in air for 2 days. The resulting metal-doped Avicel was a homogeneous green powder. To prepare for the two-step pyrolysis sequence, the powder was compressed into thin, cylindrical wafers of approximately 5 g using a pellet press with 10,000 psi force.

The first pyrolysis step was a long-duration, low-temperature char sequence. The doped Avicel pellets were placed in a tube furnace under a slow flow of argon. The furnace temperature was raised to 375° C. via a steady 20 minute ramp from room temperature. Upon reaching its setpoint, the furnace temperature was constant for 30 minutes during which time the Avicel pellet was converted into a char disk largely composed of polycyclic aromatic hydrocarbon moieties surrounding spherical nickel chloride particles of approximately 30 nm diameter. Following the charring procedure, the char pellets were immediately removed from the furnace and allowed to cool to room temperature under an argon atmosphere.

The second pyrolysis step was a short-duration, high-temperature laser sequence. A carbon dioxide laser was used as a source for extremely concentrated 10.6 μm infrared radiation. The entire 61.5 W laser output was focused into a beam of approximately 1 mm diameter at the pellet surface. During laser pyrolysis, the char disks were rotated through the incident laser beam, allowing the laser to pyrolyze the entirety of the pellet's circumference and producing HCNS. Following the laser pyrolysis, the HCNS are present in the solid phase of the char matrix.

Following the pyrolysis production, a two-step purification process was employed to prepare HCNS for battery applications. The first step was a nitric acid digestion in which the majority of the material not converted to HCNS is removed. Most of this material is amorphous carbon. The outer edges of the pyrolyzed char disk were cut off and ground into a fine powder using a mortar and pestle. The char powder was added to a flask of 70% nitric acid at a ratio of 3 g char per 100 ml of acid. The acid is heated to reflux for 5 hours. After the reflux was complete, the acid was filtered onto a fine-pored ceramic frit, separating the HCNS from the acid. Two water washes were passed through the frit to remove residual nitric acid. The deposited HCNS were allowed to dry overnight at room temperature, and then are removed from the frit.

The second step of the HCNS purification procedure employed an ultrasonication process. The HCNS powder was suspended in water at a ratio of up to 10 g HCNS per 100 ml of water. The suspension was placed in an ultrasonic bath for 2 hours. Following sonication, the suspension was filtered onto a ceramic frit; HCNS are retained on the frit. Frit-captured HCNS were washed off the frit using a water/acetone mixture. The wash was saved and evaporated, leaving behind the HCNS.

Electrode Preparation

Electrodes can be made with or without an electrically conductive additive mixed with the HCNS. Any suitable conductive additive can be utilized including without limitation conductive carbons (carbon black, graphite, lamellar graphite, mesoscopic carbons, pitch, coal pitch, coke or any other electrically conducting carbon materials), metals and alloys. An exemplary conductive additive is carbon black.

Any suitable method can be utilized to combine the HCNS and the conductive additive including, without limitation, mechanical milling, grinding and agitation in a slurry. In an exemplary method, HCNS and carbon black was combined and thoroughly mixed by agitation in a slurry.

Any suitable binder material may be utilized including, without limitation, polymeric binders such as polyvinylidene fluoride, hexafluoropropylene, polyethylene, polyethylene oxide, polypropylene, polytetrafluoroethylene, polyacrylates, substituted derivates thereof, copolymers and any other suitable combinations thereof. An exemplary binder that is suitable for combining with a HCNS material or HCNS-conductive additive composite is polyvinylidene fluoride hexafluoropropylene (PVDF-HFP). The amount of binder material to be provided in the electrode composition is preferably about 1% to about 15% by weight of the electrode composition.

Any suitable method may be utilized to sufficiently combine the binder material with the HCNS material or composite HCNS-conductive additive composite to form a generally uniform and homogenous electrode composition. In an exemplary method, the binder material is first dissolved in a solvent (such as ethyl acetate, cyclopentanone, 1-methyl-2-pyrrolidinone, and/or other suitable solvents), followed by the addition of the HCNS-conductive additive mixture to the solvent. The HCNS-conductive additive mixture are combined with the binder materials in the solvent utilizing any suitable process (e.g., agitation, sonication, etc.). A slurry is formed including the mixed HCNS-conductive additive mixture and binder materials and the solvent, and this slurry is uniformly applied (e.g., via a doctor blade) to a current collector or other suitable substrate to form the electrode. The electrode is then dried for a sufficient period of time and preferably under suitable vacuum (e.g., about 10.sup.-4 kPa) to substantially remove the solvent and any other residual moisture from the composition.

The formed electrode can be made more homogenous, compact and physically robust by any number of methods including, without limitation, mechanically pressing or processing through a rolling mill. In an exemplary process, the electrode is cold pressed (e.g., at about room temperature) at a suitable pressure (e.g., between about 200 kilopascals (kPa) and about 300 megapascals (MPa)) and for a sufficient time (e.g., between about 1 second and about 8 hours) prior to being implemented for use in a lithium ion battery.

Characterization

A useful physical parameter that provides an indication of the operational performance of the anode and the lithium ion battery is the reversible capacity of the battery. The reversible capacity, described in units of milliamp hours per gram or mAh/g, represents the amount of lithium ions per gram weight of active material (i.e., the amount of the electrode composition provided in the electrode) that is removed or deintercalated from the anode during a discharging cycle of the battery (i.e., after loading cycle and intercalation of the anode have occurred). In other words, the reversible capacity provides an indication of the charge that can be delivered by the battery during a particular cycle.

Another useful physical parameter that provides an indication of the operational performance of the anode and the lithium ion battery is the rate at which the battery can be charged. This rate can be expressed as a "C-rate". A rate of C/n is defined as being equal to a charge rate that would result in fully charging the battery in n hours. For example, charging at a C-rate of C/2 means applying a current that would fully charge the battery in 2 hour, while a C-rate of 2 C means applying a current that would fully charge the battery in 30 minutes.

While conventional anodes formed from graphite or other carbonaceous active material have good reversible capacities in lithium ion batteries when charged at low to moderate rates (for example C/5 to 1 C), as the rate of charging is increased the reversible capacity that can be achieved decreases dramatically.

The use of an anode in a lithium ion battery where the active material includes HCNS in accordance with the present invention significantly enhances the performance of the battery. Specifically, the battery can be charged to high reversible charge capacities at substantially higher rates than conventional anodes.

The performance of lithium ion anodes can be highly dependent on the electrolytic solution employed. For example, the reversible capacity of conventional graphite anodes dramatically decreases as the battery is charged and discharged repeatedly in a propylene carbonate (PC) based electrolyte. The use of an anode in a lithium ion battery where the active material includes HCNS in accordance with the present invention significantly enhances the performance of the electrode in such electrolytes in which conventional graphite anodes perform poorly.

EXAMPLE 1

In this example, HCNS was combined with carbon black (Super P.TM., obtained from (obtained from Timcal America Ltd, Westlake, Ohio)) at a mass percentage of 83.34% HCNS, 8.33% carbon black and 8.33% polyvinylidene fluoride hexafluoropropylene (PVDF-HFP, average $M_n$ ca 110,000, available from Aldrich Chemical Company Inc., Milwaukee, Wis.) copolymer binder and dissolved in 1 ml of 1-methyl-2-pyrrolidinone (NMP, ACS reagent grade, 99+% Assay, available from Aldrich Chemical Company Inc., Milwaukee, Wis.) in a fused silica flask with vacuum attachment. The mixture was homogenized by agitation in an ultrasonic bath (model FS30, 130 W, Fisher Scientific Company, Pittsburgh, Pa.) for 20 minutes while under dynamic vacuum ($10^{-4}$ kPa). The resultant slurry was then spread on a copper current collector (99.9% pure copper, available from. Alfa Aesar, Ward Hill, Mass.), using a custom doctor blade set-up, to form a circular active material of the electrode composition with a diameter of about (7/16) inch. The electrode was then dried at 130°C. for 1 hour under dynamic vacuum ($10^{-4}$ kPa), removing solvent and residual moisture, and pressed at about room temperature and 5000 psi (34,470 kPa). The mass of the electrode, not including the copper current collector, was 2.00 mg. A second electrode was prepared in a similar manner as described above, except that the active material was Timrex SFG-15 synthetic graphite (obtained from Timcal America Ltd, Westlake, Ohio) instead of HCNS. The mass of the second electrode, not including the copper current collector, was 3.00 mg.

The cell assembly and charge/discharge cycling tests were conducted in argon-filled dry boxes, fitted with re-circulating systems to keep oxygen and water content within the dry boxes below about 1 ppm. A three-electrode cell setup was constructed for each electrode, with the prepared HCNS and graphite electrodes serving as the working electrode in each cell. Each three-electrode cell included a custom-made borosilicate tee fitting to house the cell components. Each of the counter and reference electrodes was constructed by pressing a ½ inch diameter disc of lithium foil (0.75 mm thick, 99.9% pure lithium, available from Alfa Aesar, Ward Hill, Mass.) on the end of a stainless steel electrode (½ inch diameter). The lithium ends of the counter and reference electrodes were then inserted into the opposing open ends of the tee fitting. The working electrode was pressed between the lithium ends of the counter and reference electrodes and separated by a microporous polypropylene membrane separator (Celgard.RTM. 2400, Celgard Inc., Charlotte, N.C.), with the copper current collector of the working electrode extending through the third opening of the tee fitting. A nearly constant tension was applied to the reference and counter electrodes to hold them in place within the tee fitting utilizing support blocks that engaged the opposing ends of the reference and counter electrodes (i.e., the electrode ends that extended from the opposing openings of the tee fitting) and retaining springs extending between and attached to the support blocks. Ethylene carbonate/dimethyl carbonate (1:1 w/w) solution containing 1.0 M $LiPF_6$ supporting electrolyte (<10 ppm $H_2O$, Ferro Corporation, Cleveland, Ohio) was added to cover the electrodes and serve as the electrolyte. Each opening of the tee fitting was sealed with a suitable liquid-tight plug member, and the electrodes were connected in a conventional (three electrode) manner to a battery test system.

The charge/discharge cycles were controlled and measured using the following battery testing systems: Model BT2000 available from Arbin Instruments (College Station, Tex.) and Model MC-4 available from Maccor, Inc. (Tulsa, Okla.). The cells were cycled at about 25° C. and were first charged (i.e., lithium loaded into the active material of the working electrode) at a constant current corresponding to a rate of approximately C/2 to a cut-off voltage of 20 mV vs. lithium metal. Charging was continued at a constant potential of 20 mV vs. lithium metal for 3 hours and then the cell was rested for 1 h. Discharging (removal of lithium from the active material of the working electrode) was carried out at a constant current of approximately C/2 to a cut-off voltage of 1.5 V vs. lithium metal. The cells were then rested for 1 hour, completing one cycle. Four subsequent cycles were run using the same charging and discharging procedures as the first cycle. These cycles established the nominal reversible capacity of the electrodes to be 270 mAh/g (HCNS electrode) and 350 mAh/g (graphite electrode) and were used to calculate C-rates for subsequent cycles. In subsequent cycles, the cells were charged at constant current to 20 mV vs. lithium metal, rested for 1 h and then discharged at constant current at the same rate used for charging.

The measured data for the two cells (i.e., the HCNS electrode cell and the graphite electrode cell) are provided in FIG. 1. Referring to FIG. 1, cycles 1-5 were cycled at C/2, cycles 6-10 at 1 C, cycles 11-15 at 2 C, cycles 16-20 at 4 C, the charge/discharge rate increasing by increments of 4 C every 5 cycle thereafter (i.e. cycles 21-25 were cycled at 8 C, cycles 26-30 at 12 C, etc). Vertical lines in FIG. 1 demarcate these changes in charge/discharge rate. Referring to FIG. 1, it can be seen that the reversible capacity of the graphite electrode decreases sharply with an increase in charging/discharging rate. In contrast, the reversible capacity of the HCNS electrode is maintained at much higher charge/discharge rates.

EXAMPLE 2

For this example, two electrodes were made in a manner identical to those in Example 1 (one HCNS electrode and one graphite electrode). The mass of the electrodes used for this example, excluding the mass of the copper current collector, was 4.00 mg for the HCNS electrode and 3.14 mg for the graphite electrode. Cells were assembled in a manner identical to those in Example 1 except that propylene carbonate (PC) containing 1.0 M LiPF$_6$ supporting electrolyte (<10 ppm H$_2$O, Ferro Corporation, Cleveland, Ohio) was used instead of ethylene carbonate/dimethyl carbonate (1:1 w/w) solution containing 1.0 M LiPF$_6$ supporting electrolyte. The cells were cycled at about 25° C. and were first charged (i.e., lithium loaded into the active material of the working electrode) at a constant current corresponding to a rate of approximately C/2 to a cut-off voltage of 20 mV vs. lithium metal. Charging was continued at a constant potential of 20 mV vs. lithium metal for 3 hours and then the cell was rested for 1 h. Discharging (removal of lithium from the active material of the working electrode) was carried out at a constant current of approximately C/2 to a cut-off voltage of 1.5 V vs. lithium metal. The cells were then rested for 1 hour, completing one cycle. Subsequent cycles were performed in an identical manner as the first.

The measured data for the HCNS electrode cell are provided in FIG. 2. Referring to FIG. 2, it can be seen that the reversible capacity of the cell using the HCNS electrode is maintained at a high level even after multiple tens of cycles. The measured data for the graphite electrode cell is not shown in FIG. 2 as its reversible capacity is very small on the first cycle and decreases even further with subsequent cycles, in contrast to the reversible capacity of the HCNS electrode cell.

The references recited here are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

What is claimed is:

1. An electrode comprising an ion storage material, wherein the ion storage material comprises hollow carbon nanospheres composed of unitary, continuous layers of crystalline concentric graphene sheets, the electrode further comprising a current collector associated with the ion storage material.

2. The electrode of claim 1, wherein the hollow carbon nanospheres are present within the material in an amount of no less than about 30% by weight.

3. The electrode of claim 1, wherein the-hollow carbon nanospheres are present within the material in an amount of no less than about 20% by weight.

4. The electrode of claim 1, wherein the hollow carbon nanospheres are present within the material in an amount of no less than about 10% by weight.

5. The electrode of claim 1, further comprising a binder material.

6. The electrode of claim 5, wherein the binder is present in an amount of about 1% to about 15% by weight of a composition comprising the ion storage material and the binder material.

7. The electrode of claim 5, wherein the binder material is selected from the group consisting of polyvinylidene fluoride, hexafluoropropylene, polyethylene, polyethylene oxide, polypropylene, polytetrafluoroethylene, polyacrylates, substituted derivates thereof, copolymers and combinations thereof.

8. The electrode of claim 1, further comprising a carbonaceous material wherein the carbonaceous material includes graphite, lamellar graphite, pitch, coal pitch, coke, carbon black and/or other electrical conducting carbon materials, carbon-arc generated soot, and any combinations thereof.

9. A secondary ion battery including the electrode of claim 1.

10. The electrode of claim 1, wherein the ion storage material is lithium ion storage material.

11. The electrode of claim 1, wherein the material forms a layer on the current collector.

12. The electrode of claim 1, wherein the current collector is copper.

* * * * *